United States Patent [19]

Inoue et al.

[11] Patent Number: 5,947,593
[45] Date of Patent: Sep. 7, 1999

[54] TWIN-SCREW KNEADING APPARATUS

[75] Inventors: Kimio Inoue; Katsunori Takahashi; Tatsuya Tanaka; Masahiko Kashiwa; Shigehiro Kasai; Yoshinori Kuroda; Hideo Funahashi; Yasuaki Yamane; Koichi Miyake; Masashi Konno; Akira Nishiyama, all of Takasago, Japan

[73] Assignee: Kabushiki Kaisha Kobe Seiko Sho, Kobe, Japan

[21] Appl. No.: 08/997,255

[22] Filed: Dec. 23, 1997

[30] Foreign Application Priority Data

Dec. 24, 1996 [JP] Japan .................................. 8-343074
Jan. 21, 1997 [JP] Japan .................................. 9-008332
Oct. 6, 1997 [JP] Japan .................................. 9-272339

[51] Int. Cl.$^6$ ...................................................... B29B 7/48
[52] U.S. Cl. .............................................. 366/85; 366/84
[58] Field of Search .................................. 366/79, 81, 83, 366/84, 85, 88, 89, 96, 97, 297, 299, 301, 300, 322, 323, 324; 425/206

[56] References Cited

U.S. PATENT DOCUMENTS

| 3,829,067 | 8/1974 | Matsuoka ................................... 366/84 |
| 4,131,371 | 12/1978 | Tynan . | |
| 4,332,481 | 6/1982 | Inoue et al. ............................... 366/84 |
| 4,352,568 | 10/1982 | Lohr et al. . | |
| 4,474,475 | 10/1984 | Moriyama . | |
| 4,556,324 | 12/1985 | Tynan ........................................ 366/85 |
| 4,824,256 | 4/1989 | Haring et al. ............................ 366/85 |
| 4,826,323 | 5/1989 | Loomans et al. ........................ 366/85 |
| 5,487,602 | 1/1996 | Valsamis et al. . | |
| 5,590,959 | 1/1997 | Ueda et al. . | |
| 5,672,005 | 9/1997 | Fukui et al. . | |

FOREIGN PATENT DOCUMENTS

| 0 002 131 | 5/1979 | European Pat. Off. . | |
| 0 788 868 | 8/1997 | European Pat. Off. . | |
| 595168 | 2/1978 | U.S.S.R. ................................ 366/85 |
| 376184 | 7/1932 | United Kingdom ..................... 366/96 |
| 2027600 | 2/1980 | United Kingdom ..................... 366/83 |

Primary Examiner—Tony G. Soohoo
Attorney, Agent, or Firm—Oblon, Spivak, McClelland, Maier & Neustadt, P.C.

[57] ABSTRACT

A kneaded product of a desired state of kneading is available by causing a material to be kneaded to flow in tip clearances between rotor segments 1b and 1b of screw sets 1 and 1 and an inner wall surface of a chamber 4 while rotating the screw sets 1 and 1 provided to the right and the left of the chamber 4, and imparting a shearing force for dispersion. Each rotor segment 1b has a plurality of kneading blade 7 having different distances between the segment center and the top, so as to achieve a plurality of tip clearances different at least in the circumferential direction when the segment center is aligned with the chamber center.

13 Claims, 14 Drawing Sheets

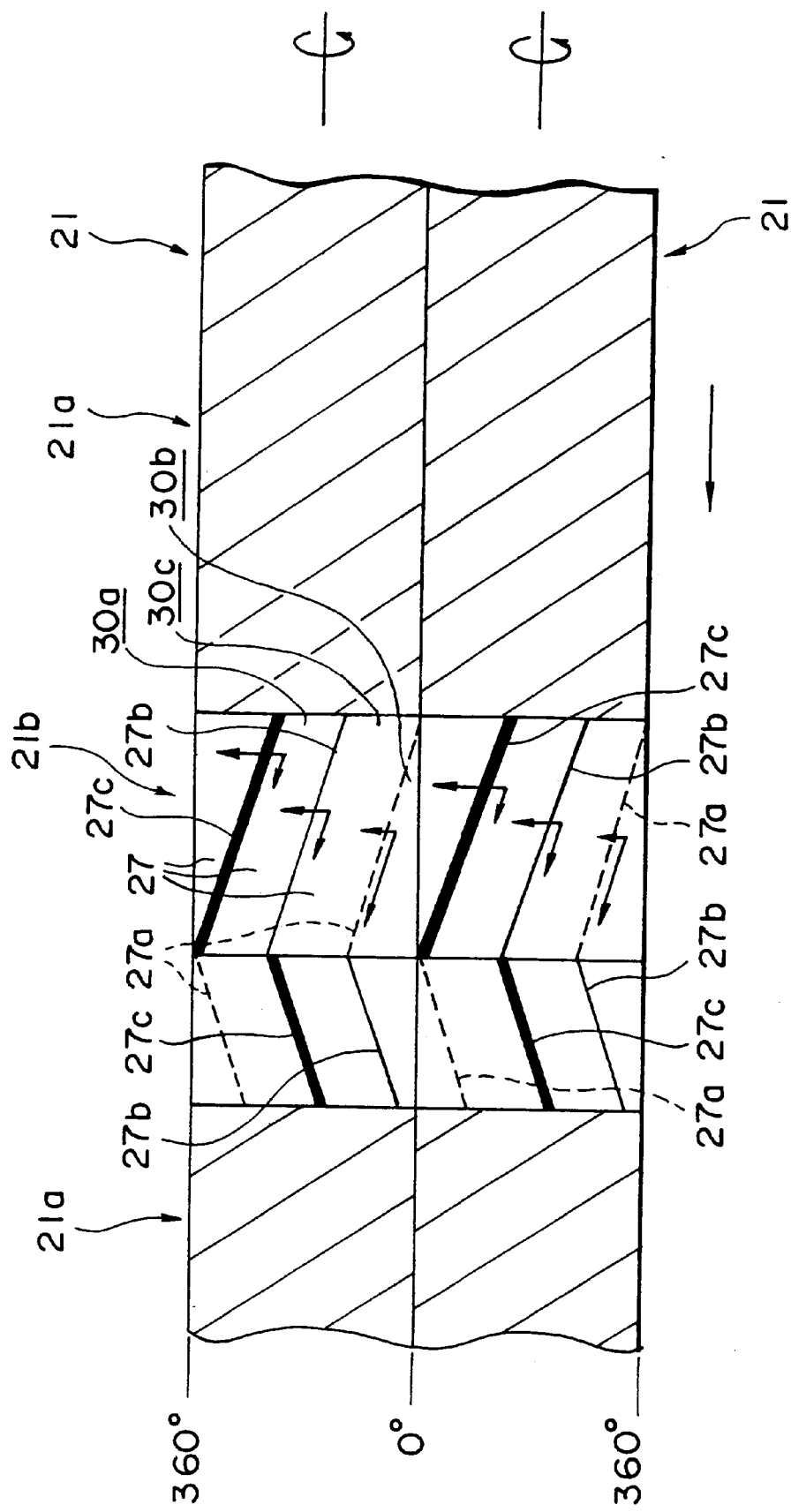

TWIN-SCREW KNEADING APPARATUS

BACKGROUND OF THE INVENTION

1. Field of the Invention

The present invention relates to a twin-screw kneading apparatus which kneads materials to be kneaded such as rubber and plastics.

2. Description of the Related Art

A twin-screw kneading apparatus has generally a configuration of manufacturing continuously a kneaded product through a series of operations comprising the steps of arranging a pair of screw sets including kneading segments provided with kneading blades such as rotor segments or kneading disk segments in a chamber communicating from a side to the other side, charging a material to be kneaded such as rubber or plastics from a charging port on one side, forming a kneaded product of a desired state of kneading through kneading at kneading segments while transferring the charged material by the rotation of the screw sets to the other side, and discharging the kneaded product from a discharge port on the other side to outside.

The foregoing kneading is accomplished by applying a rotation force of the kneading segments as a shearing force to the material to be kneaded. It is known that the shearing force becomes maximum at a gap (tip clearance) between the kneading segment and the inner wall of the chamber, and this maximum shearing force increases according as the tip clearance decreases. Therefore, by reducing the tip clearance, it is evidently possible to promote kneading under the effect of dispersing action of the large shearing force. A smaller tip clearance imparts however a locally high shearing force to the material to be kneaded, resulting in early heating of the material to be kneaded to a high temperature.

When manufacturing a kneaded product having a relatively low allowable temperature such as rubber, therefore, measures are taken to set an increasing tendency of the tip clearance so that heating to a temperature over the allowable level even at a low kneading efficiency. When manufacturing a kneaded product of a high allowable temperature, it is the usual practice to sufficiently reduce the tip clearance so as to obtain a large shearing force, placing importance on the kneading efficiency. The conventional continuous kneading apparatus is, as described above, to accomplish kneading by selecting an appropriate tip clearance in response to the kneading conditions such as the kind of material and viscosity, and rotating the kneading segments with the selected tip clearance.

In the aforesaid conventional configuration, however, the tip clearance is appropriate only for specific kneading conditions. When the kind of the material is changed over, requiring different kneading conditions, for example, it is necessary to replace the kneading segments so as to achieve a tip clearance corresponding to the new kneading conditions. Unless this replacement is properly conducted, the tip clearance would be too large or too small to ensure sufficient kneading or dispersion or heating to a temperature over the allowable temperature may be caused.

The present invention has therefore an object to provide a twin-screw kneading apparatus which permits satisfactory kneading and dispersion of a material to be kneaded under various kneading conditions into a desired state of kneading, and enables to prevent an excessive increase in temperature.

SUMMARY OF THE INVENTION

In order to achieve the foregoing object, the present invention provides a twin-screw kneading apparatus for kneading a material into a kneaded product of a desired kneading state by providing a pair of screw sets to the right and the left in a chamber, causing a material to be kneaded to flow in a tip clearance between kneading segments of these screw sets and the chamber inner wall surface while rotating the screw sets at the center of the chamber, and imparting a shearing force for dispersion, wherein the kneading segments have a plurality of kneading blades having different distances between the center of the segment and the top so as to achieve a plurality of tip clearances different at least in the circumferential direction when the centers of the kneading segments are aligned with the center of the chamber.

The different tip clearances achieved by the kneading blades can be classified at least into relatively small tip clearances and relatively large tip clearances. In the small tip clearances, a major portion of the material to be kneaded present on the forward side of these tip clearances is caused to flow in the axial direction, and a part is caused to pass through to achieve dispersion under the effect of a large shearing force. In the large tip clearances, on the other hand, a major portion of the material to be kneaded present on the forward side is passed through to promote the flow in the circumferential direction for applying a uniform shearing action to the material, and heating is prevented by a small shearing force. As a result, when tip clearances different in size appear at least in the circumferential direction, the material to be kneaded is dispersed by a large shearing force while discontinuously and actively flowing in the entire chamber, and heating during heating is prevented. It is therefore possible always to knead the material into a kneading product in a desired kneading state under various kneading conditions.

The distance between the center of the kneading segment and the top of the kneading blade can be changed by cutting the top of the kneading blade. It is thus possible obtain screw sets having kneading segments capable of achieving a desired tip clearance by cutting the existing kneading segments, hence to reduce the equipment cost as compared with preparation of all new kneading segments.

Because each kneading blade corresponds to each tip clearance, change and setting of each tip clearance can be independently accomplished through adjustment of the individual kneading blades. Design is therefore easier and change and setting of tip clearances are easier than in change and setting of the individual tip clearances through determination of eccentricity positions from the relationship with all kneading blades as is disclosed in Japanese Examined Patent Publication No. 1-14,847.

Particularly when a material is kneaded through tip clearances comprising various combinations to determine tip clearances permitting achievement of optimum kneading conditions such as flow and shearing of the resin, achievement of tip clearances of various combinations by the method based on eccentricity requires preparation of kneading segments in a number equal to that of the combinations. According to the invention, it is possible to achieve optimum combinations of tip clearances with a number of kneading segments smaller than that of combinations by sequentially cutting the tops of the kneading blades. While the amount of clearance varies in response to the rotational position in the foregoing known art because tip clearances are formed on the basis of eccentricity, the amount of clearance is always constant (irrespective of the rotational position) if a single tip clearance is viewed, in the present invention, thus ensuring acting of a uniform shearing force.

Further, the kneading blades should preferably be configured so as to achieve three different kinds of tip clearance in the circumferential direction. More specifically, medium tips forming medium tip clearances should preferably be provided so as to adjust shearing force and flow of the material to be kneaded at high-level tip portions and low-level tip portions, in addition to the high-level tip portions of the smallest tip clearances and the low-level tip portions of the largest tip clearances.

It is desirable to set the smallest tip clearances within a range of from 0.002 to 0.02 relative to the inside diameter, and the largest tip clearances within a range of from 0.08 to 0.2 relative to the inside diameter. When providing three kinds of tip clearances including high-level, low-level and medium-level tip portions, the smallest tip clearances should preferably be within a range of from 0.002 to 0.02, the largest tip clearances, within a range of from 0.08 to 0.2, and the medium tip clearances, within a range of from 0.02 to 0.08.

When the foregoing kneading segments are integrated type rotor segments, it is possible to easily form kneading blades for various tip clearances through continuous cutting.

When the foregoing kneading segments are divided type rotor segments, it is possible to achieve various tip clearances in the form of combinations of various rotor segments by forming kneading blades so as to achieve tip clearances intrinsic to individual divided rotor segments with various spiral angles and various quantities.

When the foregoing kneading segments are a plurality of divided type disk segments, it is possible to achieve various combinations of tip clearance in the circumferential directions as well as in the axial direction by combining the plurality of disk segments.

When the foregoing kneading segments comprise combinations of integrated type or divided type rotor segments and divided type disk segments, the kneading performance can be fine-adjusted by first roughly setting kneading performance by means of the rotor segments, and then combining the same with the disk segments having various tip clearances.

It is possible to largely improve kneading performance by providing the foregoing kneading segments at a plurality of positions.

Further, by causing the kneading blades of the kneading segments in the both screw sets to engage with each other, transfer of the material to be kneaded between the screw sets is promoted, thus further improving kneading performance.

In addition, the both screw sets are rotated in a direction so as to scrape off the material to be kneaded adhering to the kneading segments by means of the kneading blades in engagement. Because this scrapes off the material to be kneaded adhering to the kneading segments with the kneading blades, the kneading segments are in a well cleaned state. When production of the kneaded product for the next run is started, there is only a slight amount of residual material to be kneaded from the preceding run, thus permitting reduction of loss of the material to be kneaded upon starting up production.

The peripheral surface between the tops of the kneading blades in the foregoing kneading segments is formed into a curved convex shape so as to be in contact with the top of the kneading blade in engagement. This permits more excellent scraping of the material to be kneaded adhering to the kneading segments by means of the kneading blades.

BRIEF DESCRIPTION OF THE DRAWINGS

FIG. 2 represents descriptive view s illustrating conditions of arrangement of screw sets in a continuous kneading apparatus.

FIG. 13 is a exploded view of the screw set;

DESCRIPTION OF THE PREFERRED EMBODIMENTS

Embodiment 1

Figure 1:
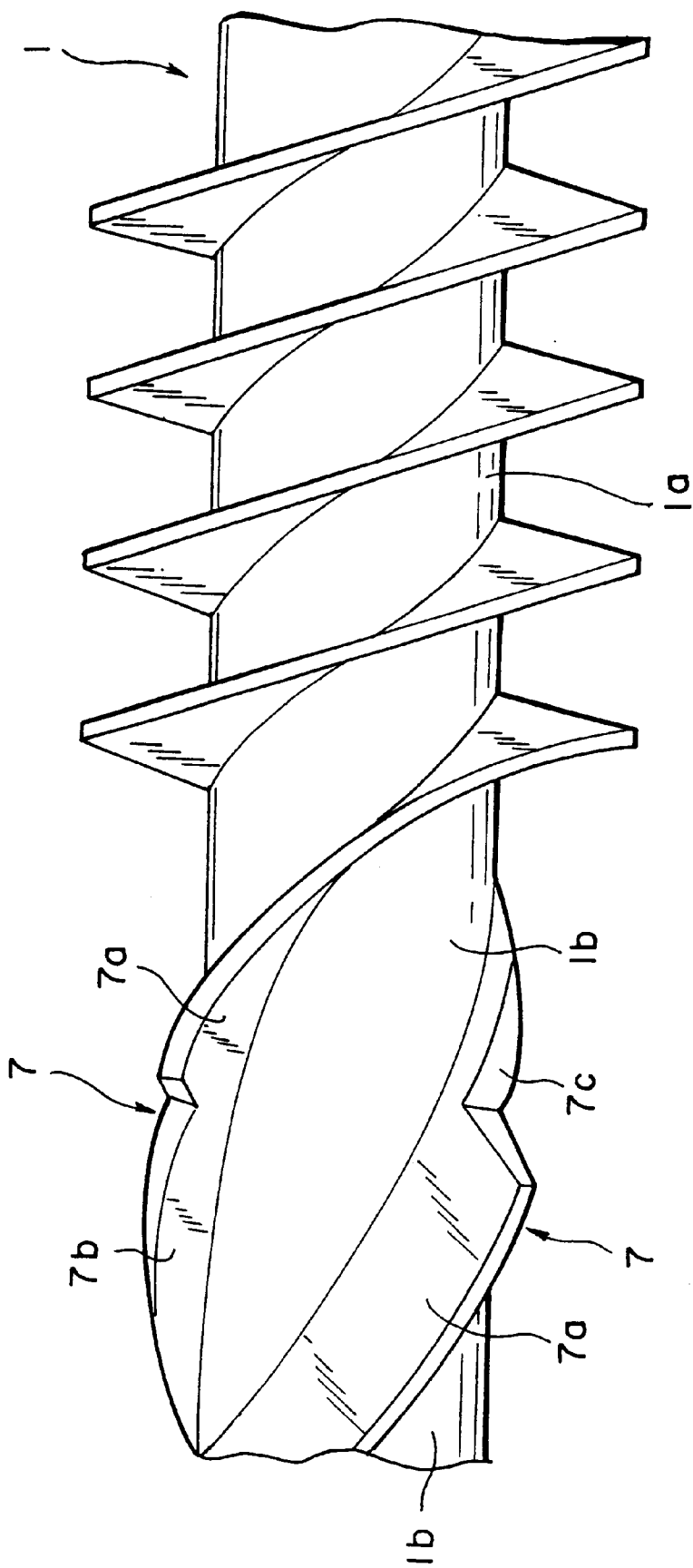
FIG. 1 is a front view of an important portion of a screw segment.

Embodiments of the invention will be described below with reference to FIGS. 1 to 7.

A continuous kneading apparatus which is a kind of the twin-screw kneading apparatuses of this embodiment has a pair of screw sets 1 and 1 and a case member 3 rotatably supports these screw sets 1 and 1. A cooling piping not shown is connected through the case member 3 to an outer wall of the case member 3 so as to cool a material to be kneaded. In the interior of the case member 3, on the other hand, there is formed a chamber 4 communicating from a side (right side in FIG. 2) to the other side (left side in FIG. 2). On one side of the case member 3, a charging port 3a communicating with the chamber 4 is formed so as to supply a material to be kneaded such as rubber or plastics to the chamber 4. On the other side of the case member 3, discharge members 2 and 2 for discharging the kneaded material to outside are provided to correspond to the screw sets.

Figure 2A:
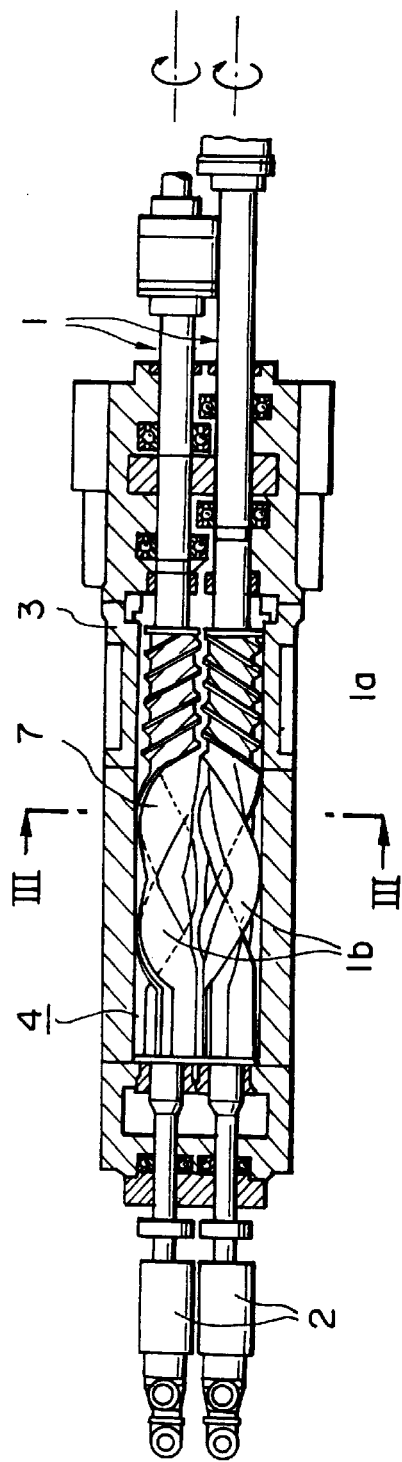
FIG. 2A shows a plan view and FIG. 2B shows a front view.
Figure 2B:
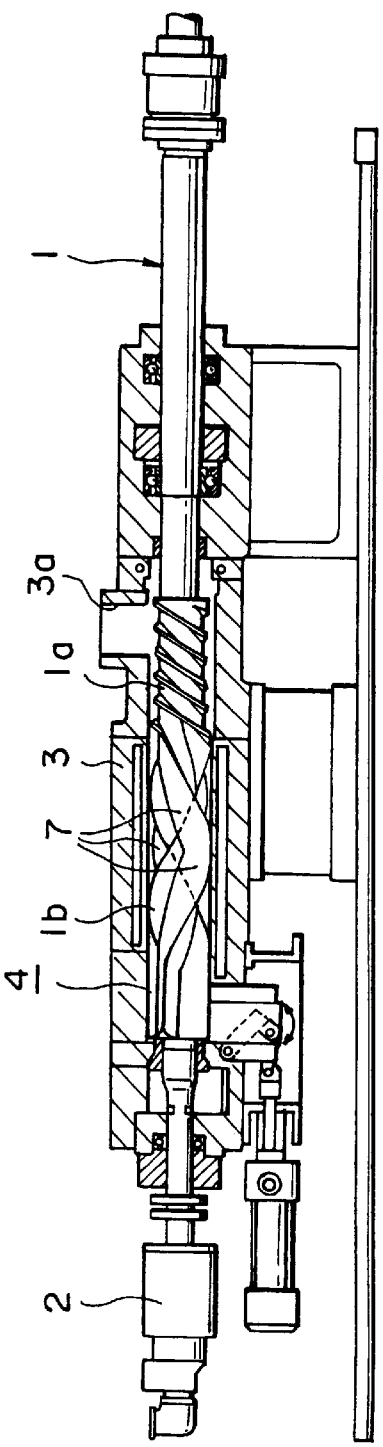
Figure 3:
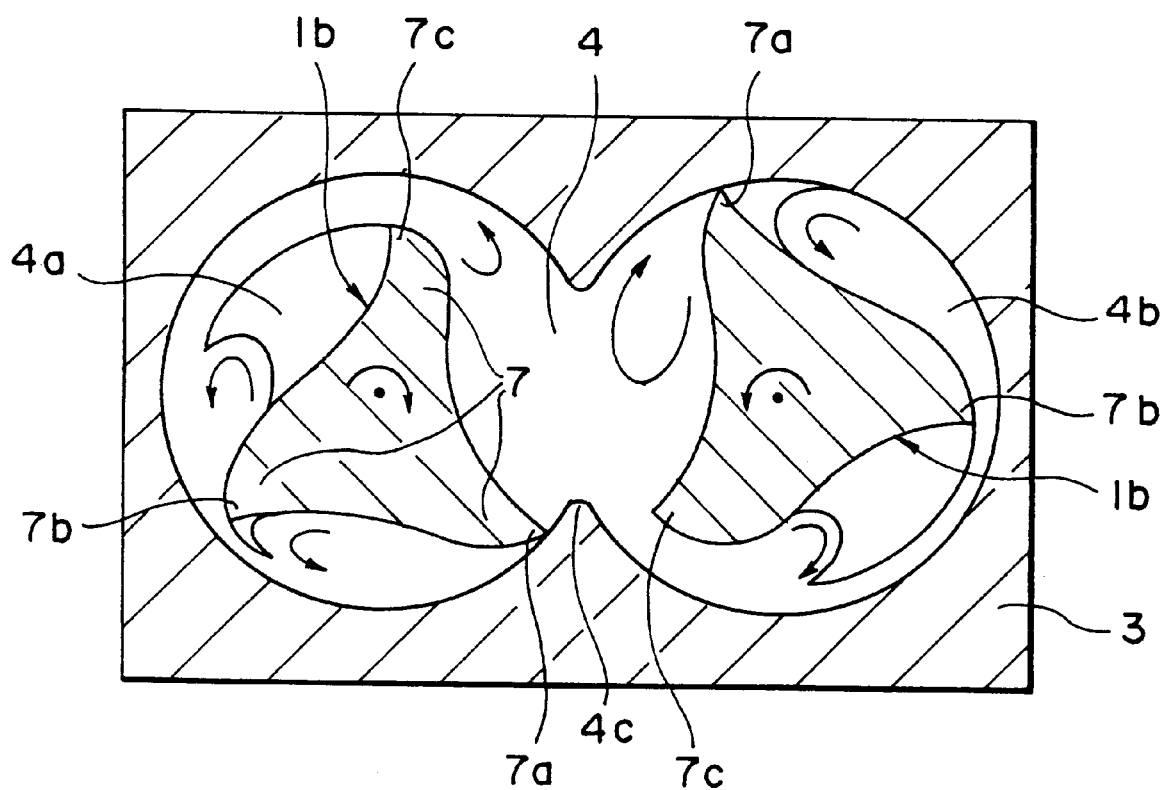
FIG. 3 is a descriptive view illustrating a state of kneading a material to be kneaded in FIG. 2 cut along the line A—A.

The foregoing chamber 4 has a longitudinal sectional shape of an ellipsoid as shown in FIG. 3, and comprises a first kneading chamber 4a and a second kneading chamber 4b in a pair, and a communicating section 4c ensuring communication between the kneading chambers 4a and 4b. The foregoing sets 1.1 are respectively inserted into these first and second kneading chambers 4a and 4b as shown in FIGS. 2A and 2B.

The two screw sets 1 and 1 are arranged so as to make the axes thereof in parallel to each other, and are connected to a driving mechanism not shown outside the case member 3 so as to be rotation-driven in reverse directions to each other by this driving mechanism. The rotational centers or rotational axes of the both screw sets by the driving mechanism are aligned with the chamber centers of the case member 3. The chamber center is present for each of the kneading chambers 4a and 4b of two chamber 4, and means the central point located at equal distance from the wall surface of each of the kneading chamber 4a and 4b having an arcuate sectional shape.

Each of the aforesaid screw sets 1 and 1 has a screw segment 1a which pushes the material to be kneaded to the other side and an integrated type rotor segment 1b which kneads the material to be kneaded. Segment centers of segment 1a and 1b are aligned with the rotational center of the screw set 1 (chamber center). The segment center of the screw height in the circumferential direction, the central point located at an equal distance from the top of this screw blade. The segment center of the rotor segment 1b means the central point located at an equal distance from the top of each kneading blade 7.

The screw segment 1a and the rotor segment 1b are housed in the chamber 4. The rotor segment 1b has three kneading blades 7, 7 and 7 arranged at equal angular internals of 120° in the circumferential direction. Each kneading blade 7 is formed spirally from one side to the middle portion, and the spirally formed in the reverse direction form the middle portion to the other side.

The aforesaid kneading blade 7 is partitioned so that the top tip of each of the positive-direction and reverse- direction sections contains any two of a high-level tip portion 7a, a medium-level tip portion 7b and a low-level tip portion 7c, so that, for all the three kneading blade 7, 7 and 7 arranged in the circumferential direction, the high-level tip portion 7a, the medium-level tip portion 7b and the low-level tip portion 7c are in a sectional plane.

The distance between the segment center and each of the tip portion 7a, 7b and 7c is small in this order so that the tip clearances which are gaps with the inner wall surface of the chamber 4 are larger in this order when the segment center of the rotor segment 1b is in agreement with the chamber center. When a low-viscosity material or a fine filler or pigment is dispersed into a kneaded product, in general, the tip portion 7a, 7b and 7c are set to achieve small tip clearances as a whole. When a high-viscosity material is dispersed into a kneaded product, on the other hand, the tip portions 7a, 7b and 7c are set to achieve large tip clearances as a whole.

More specifically, the high-level tip portion 7a arranged in the proximity of the inner wall surface of the chamber 4 so as to form the smallest tip clearance having ratio range of from 0.002 to 0.06 (preferably from 0.002 to 0.02) relative to the inside diameter (D). The ratio range of from 0.002 to 0.06 relative to the inside diameter (D) represent a commonly used range, and that of from 0.002 to 0.02 represents a standard one. More particularly, the high-level tip portion 7a is formed so as to achieve a tip clearance within a range of from 0.1 to 3.0 mm (preferably from 0.1 to 1.0 mm) for an inside diameter (D) of the kneading chambers 4a and 4b of 50 mm, within a range of from 0.2 to 4.0 mm (preferably from 0.2 to 2.0 mm) for an inside diameter (2D) of 100 mm, and within a range of from 0.6 to 18.0 mm (preferably from 0.6 to 6.0 mm) for and inside diameter (3D) of 300 mm. As a result, the high-level tip portion 7a causes part of the material to be kneaded to pass through upon rotation of the rotor segment 1b to impart a large shearing force to the material, and at the same time, scrapes off the surface layer of the material to be kneaded adhering to the inner wall surface of the chamber, thus improving the cooling efficiency. Further, the high-level tip portion 7a promotes the flow in the axial direction by causing most of far material to be kneaded located on the forward side to axially flow, and also the flow between the first kneading chamber 4a and the second kneading chamber 4b, thereby permitting improvement of kneading efficiency and dispersing efficiency.

The low-level tip portion 7c is, on the other hand, sufficiently separated from the inner wall surface of the chamber 4 so as to form the largest tip clearance is a ratio within a range of from 0.02 to 0.3 (preferably from 0.08 to 0.2) relative to the inside diameter (D). The ratio range of from 0.02 to 0.3 relative to the inside diameter (D) represents a commonly used range, and that of from 0.08 to 0.2 represents a standard one. More specifically, the medium-level tip portion 7b is formed so as to achieve a tip clearance within a range of from 1.0 to 15.0 mm (preferably from 4.0 to 10.0 mm) for an inside diameter (D) of the kneading chambers 4a and 4b of 50 mm, within a range of from 2.0 to 30.0 mm (preferably from 8.0 to 20.0 mm) for an inside diameter (2D) of 100 mm, and within a range of from 6.0 to 90.0 mm (preferably from 24.0 to 60.0 mm) for an inside diameter (3D) of 300 mm. As a result, the low-level tip portion 7C increases the amount of material to be kneaded by imparting a small shearing force to the material in the tip clearance to promote the flow of the material in the kneading chambers 4a and 4b upon rotation of the rotor segment 1b, and at the same time, prevents a locally large shearing force from being applied to inhibit excessive heating of the material to be kneaded.

The medium-level tip portion 7a is set so as to form a medium tip clearance coming between the high-level tip clearance 7a and the low-level tip clearance with a view adjusting the shearing force and the flow of the material to be kneaded by the high-level tip portion 7a and the low-level tip portion 7c, within a ratio range of from 0.01 to 0.12 relative to the inside diameter (D) (preferably from 0.02 to 0.08). The ratio range of from 0.01 to 0.12 relative to the inside diameter (D) represents a commonly used range, and the ratio range of from 0.02 to 0.08 represents a standard one. More specifically, the medium-level tip portion 7b is formed so as to achieve a tip clearance within a range of from 0.5 to 6.0 mm (preferably from 1.0 to 4.0 mm) for an inside diameter (D) of 50 mm of the kneading chambers 4a and 4b, within a range of from 1.0 to 12.0 (preferably from 2.0 to 8.0 mm) for an inside diameter (2D) of 100 mm, and within a range of from 3.0 to 36.0 (preferably from 6.0 to 24.0 mm) for an inside diameter (3D) of 300 mm.

For the fabrication of the foregoing clip portions 7a, 7b and 7c, the following methods an applicable.

Figure 4:
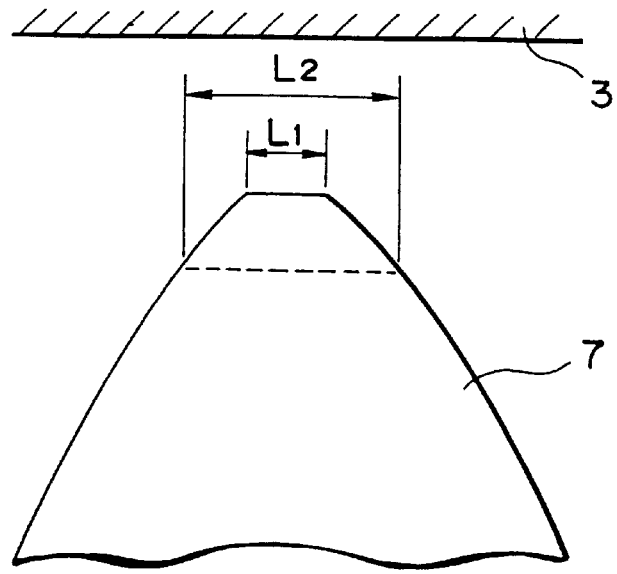
FIG. 4 is a descriptive view illustrating a method of fabricating a kneading blade.
Figure 5:
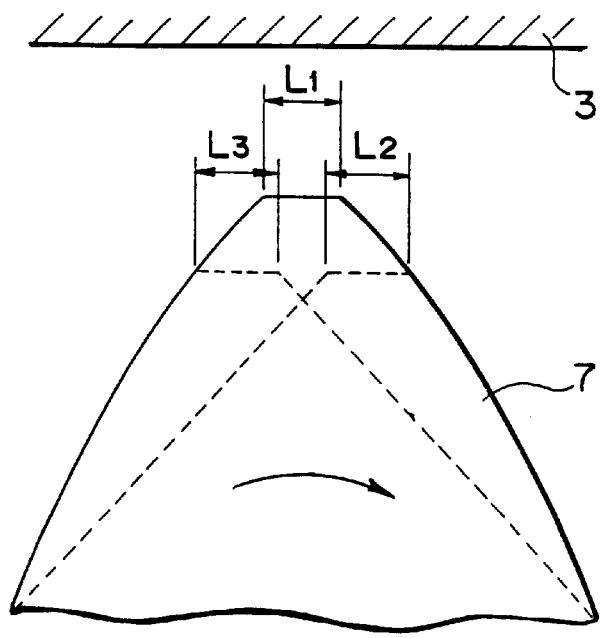
FIG. 5 is a descriptive view illustrating another method of fabricating a kneading blade.
Figure 6:
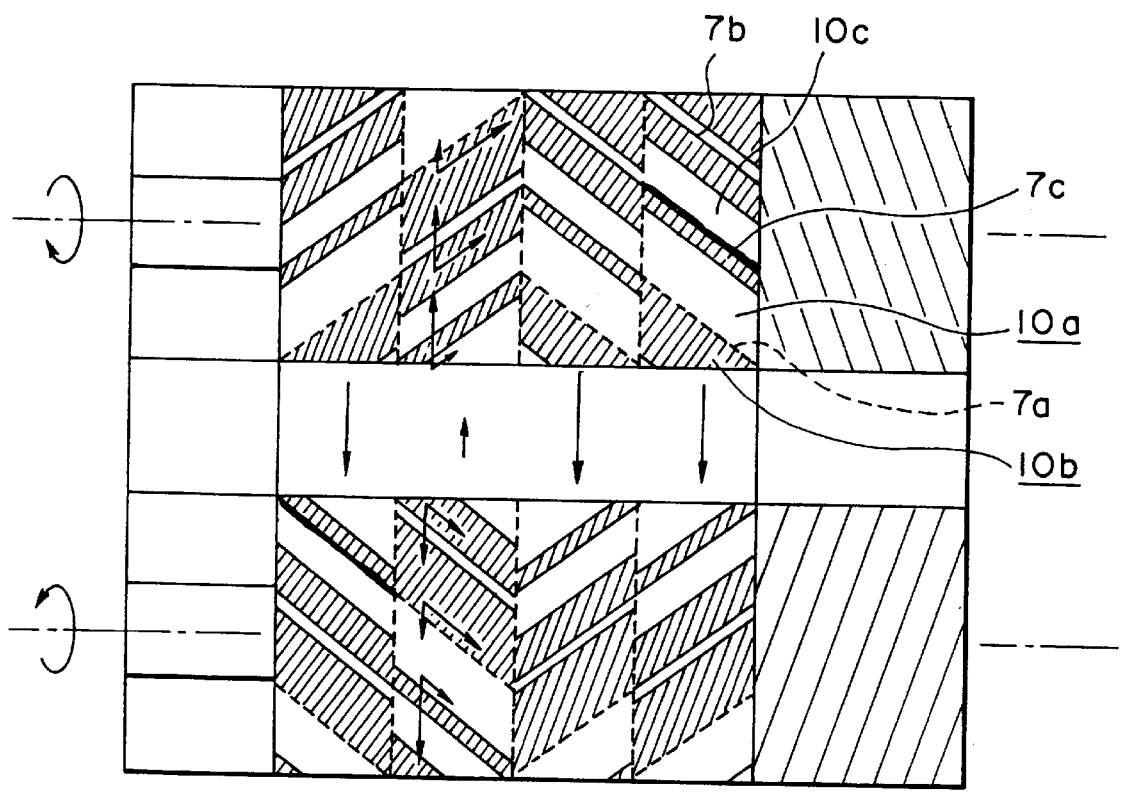
FIG. 6 is a descriptive view illustrating the flow of the material to be kneaded in a rotor segment of the present invention.

First, a screw set 1 is prepared, which has kneading blades 7, 7 and 7 of the individual tip portion 7a, 7b and 7c with the same height in the same shape so as to achieve an equal distance between the segment center and the tip portion 7a, 7b and 7c. An existing screw set 1 may be employed. Then, as shown in FIG. 4, the top of the kneading blade 7 is cut so that the tip portion has a land with L2 expanded from the land with L, before cutting (first fabricating method), or the sides of the kneading blade 7 are cut so that the tip portion has a land width L2 equal to the land with L1 before cutting (second fabricating method). In the second fabricating method, two practices are available: one comprising cutting the forward surface to achieve a change in the biting angle with the chamber wall surface, and the other comprising cutting the backward surface giving no change in the biting angle. When fabricating the kneading blade 7 into a continuous shape, adoption of the aforesaid fabricating method ensures easier manufacture. When fabricating the kneading blade 7 into a divided shape, adoption of any of the first and the second fabricating methods permits easy manufacture. However, because the effect of the land width on the temperature of the material to be kneaded or on the filler dispersion is smaller than that of the tip clearances, the first fabricating method is more practicable.

For the above-mentioned configuration, operation of the continuous kneading apparatus will now be described below.

First, as shown in FIG. 2, a material to be kneaded such as rubber, plastics or a filler in continuously supplied through the charging part 3a into the chamber 4 while rotation-driving the screw sets 1 and 1. Before or after this supply, a cooling medium such as cooling water is caused to flow in the cooling piping connected to the outer wall surface of the case member 3 to cool the material to be kneaded in the chamber 4 via the case member 3. For some configurations or kinds of the material to be kneaded such as one containing a filler, a hot medium such as hot water of steam may be caused to flow through the cooling piping to heat the material to be kneaded.

The material to be kneaded changed into the chamber 4 proceeds toward the rotor segments 1b, 1b and 1b along with rotation of the screw segments 1a and 1a. When the material to be kneaded reaches the rotor segments 1b and 1b, kneading is started at the kneading blades 7, 7 and 7 of the individual rotor segments 1b and 1b.

That is, as shown in FIG. 3, in the high-level tip portion 7a of the kneading blade 7 corresponding to the small tip clearance, the amount of the material in kneading, comprising the material to be kneaded and the kneaded product, passing through the tip clearance is smaller. Therefore the material in kneading present on the forward side of the high-level tip portion 7a flows in a large quantity in the axial direction. As a result, most of the material moves to the forward side of the medium-level tip portion 7b adjacent in the axial direction, and a portion passes through the tip clearance. This portion of material is subjected to a large shearing force resulting from the small tip clearance and dispersed. At this point, the material in kneading imparted with a large shearing force is rapidly heated along with dispersion. However, because most part of the material in kneading flows in the axial direction, heating of the material in kneading as a whole is inhibited. Even with a low allowable temperature of the material in kneading, therefore, it is possible to continue dispersion under the large shearing force.

The high-level tip portion 7a of the kneading blade 7 moves near the inner wall surface of the chamber 4, thus scraping off the surface layer of the material in kneading adhering to the inner wall surface of the chamber 4. This improves the cooling efficiency of the flowing material in kneading by the cooling piping, and further inhibits heating of the material in kneading. In addition, when the high-level tip portion 7a of the kneading blade 7 moves in the communicating section 4c, it pushed out the material in kneading from the first or second kneading chamber 4a or 4b on one side toward the second or first kneading chamber 4b or 4a on the other side with a large pushing force, thus promoting the flow of the material in kneading between the first and the second kneading chamber 4a and 4b.

Since the low-level tip portion 7c forms a large tip clearance, the amount of the material in kneading passing through the tip clearance is large. Therefore, most of the material in kneading present on the forward side of the low-level tip portion 7c moves on the forward side of the medium-level tip portion 7b adjacent in the circumferential direction as a result of passage though the tip clearance, and a portion flows in the axial direction. Because the material in kneading is pushed out by a slight pushing force, the flow thereof the first and the second kneading chambers 4a and 4b during move through the communicating section 4c is inhibited. The low-level tip portion 7c therefore promotes the flow of the material in kneading in the kneading chambers 4a and 4b, and during the flow, the large tip clearance reduces the shearing force acting on the material in kneading, thus inhibiting excessive heating of the material in kneading.

The medium-level tip portion 7b is set so as to lead to a tip clearance coming between the high-level tip portion 7a and the low-level tip portion 7c. This permits adjustment of the shearing force and the flow of the material in kneading.

Figure 7:
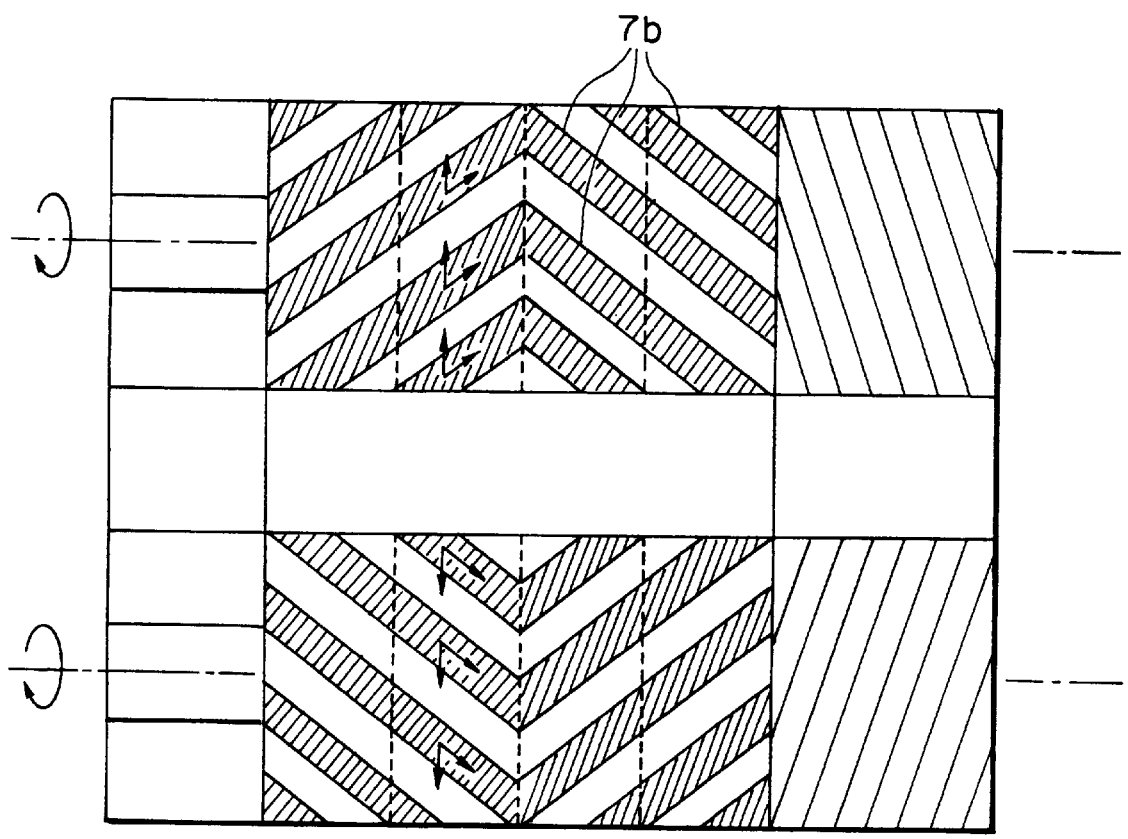
FIG. 7 is a descriptive view illustrating the flow of the material to be kneaded in a conventional rotor segment.

When the material in kneading is kneaded as described above, there are achieved as shown in FIG. 6, in succession in the circumferential and axial directions a first kneading space 10a which causes the material in kneading to flow in the circumferential direction in a large quantity, a second kneading space 10b which causes dispersion of a slight amount of the material in kneading under the effect of a large shearing force while causing the material in kneading to flow in the axial direction in a large quantity, and a third kneading space 10c which impart a medium shearing force to cause flow in the axial and circumferential directions. As shown in FIG. 7, therefore, as compared with a conventional case in which the kneading blade 7 comprises only a medium-level tip portion 7b, the material in kneading is uniformly dispersed which discontinuously and actively flowing in the first to third kneading spaces. It is therefore possible to obtain a kneaded product always in a satisfactory kneading condition without changing the tip clearance in response to the kneading conditions of the material in kneading.

As described above, the continuous kneading apparatus (twin-screw kneading apparatus) of the embodiment is based on steps, as shown in FIGS. 1 and 2, of, while rotating the pair of screw sets 1.1 provided to the right and to the left in the chamber 4 at the center of the chamber, causing the material in kneading to flow through the tip clearance between the rotor segments 1b and 1b (kneading segments) of the screw sets 1.1 and the chamber 4 inner wall surface, and dispersing the same by imparting a shearing force, thereby producing a kneaded product in the desired kneaded state, and has the following configuration.

More specifically, the continuous kneading apparatus has a configuration in which, when the segment center of the rotor segment 1b is aligned with the chamber center, a plurality of kneading blades having different distances between the segment center and the top are formed in the rotor segment 1b so that a plurality of tip clearances different at least in the circumferential direction are formed.

According to the foregoing configuration, it is possible to classify the different tip clearances formed by the kneading blades 7 at least into relatively small tip clearances and relatively large tip clearances. In the small tip clearance, most part of the material in kneading present on the forward side of the clearance is caused to flow in the axial direction, and a part is allowed to pass through to accomplish under the effect of a large shearing force. In the large tip clearance, on the other hand, most part of the material in kneading present on the forward side is allowed to pass through to promote the flow is the circumferential direction, thus applying an uniform shearing action to the kneaded product, and heating is prevented by a small shearing force. When tip clearances different in size are achieved at least in the circumferential direction as a result, the material in kneading is dispersed by the large shearing force within discontinuously and actively flowing in the chamber 4 as a whole, and heating to high temperature during dispersion is prevented. It is therefore possible to obtain a material under a desired kneading condition from a material in kneading under severe kneading conditions such as a polymer gel or a filler having a high aggregating power including carbon black, without conventional replacing of screw set 1.

The distance between the segment center of the rotor segment 1b and the top of the kneading blade 7 can be altered by cutting the top of the kneading blade 7. It is therefore possible to obtain a screw set 1 provided with the rotor segment 1b capable of achieving a desired tip clearance by cutting an existing rotor segment. This reduces the equipment cost as compared with the case where a screw set 1 provided with all new rotor segment 1b is prepared.

Since the kneading blade 7 one-to-one corresponds to a tip clearance, change and setting of the individual tip clearances can be effected independently by adjusting the individual kneading blade 7. Design is therefore easier and change and setting are easier than in a case where an eccentricity position is determined from the relationship with each of all the kneading blades 7, thereby accomplishing change and setting of the individual tip clearance as is disclosed, for example, in Japanese Examined Patent Publication No. 1-14,847.

Particularly, when kneading is conducted with tip clearances comprising various combinations to determine tip clearances which achieve optimum kneading conditions such as flow and shearing of resin, achievement of various combinations of tip clearances by a method based on eccentricity would require rotor segments 1b in a number equal to the number of combinations. In the present invention, however, it is possible to determine optimum combinations of tip clearances with rotor segments in a number smaller than the number of combinations. While the tip clearances are formed by means of eccentricity in the foregoing prior art, resulting in variation of the amount of clearance in response to the rotational position, the amount of clearance is always constant in the present invention (respective of the rotational position) when a single tip clearance is viewed, in the configuration of this embodiment, thus permitting action of a uniform shearing force.

Figure 10:
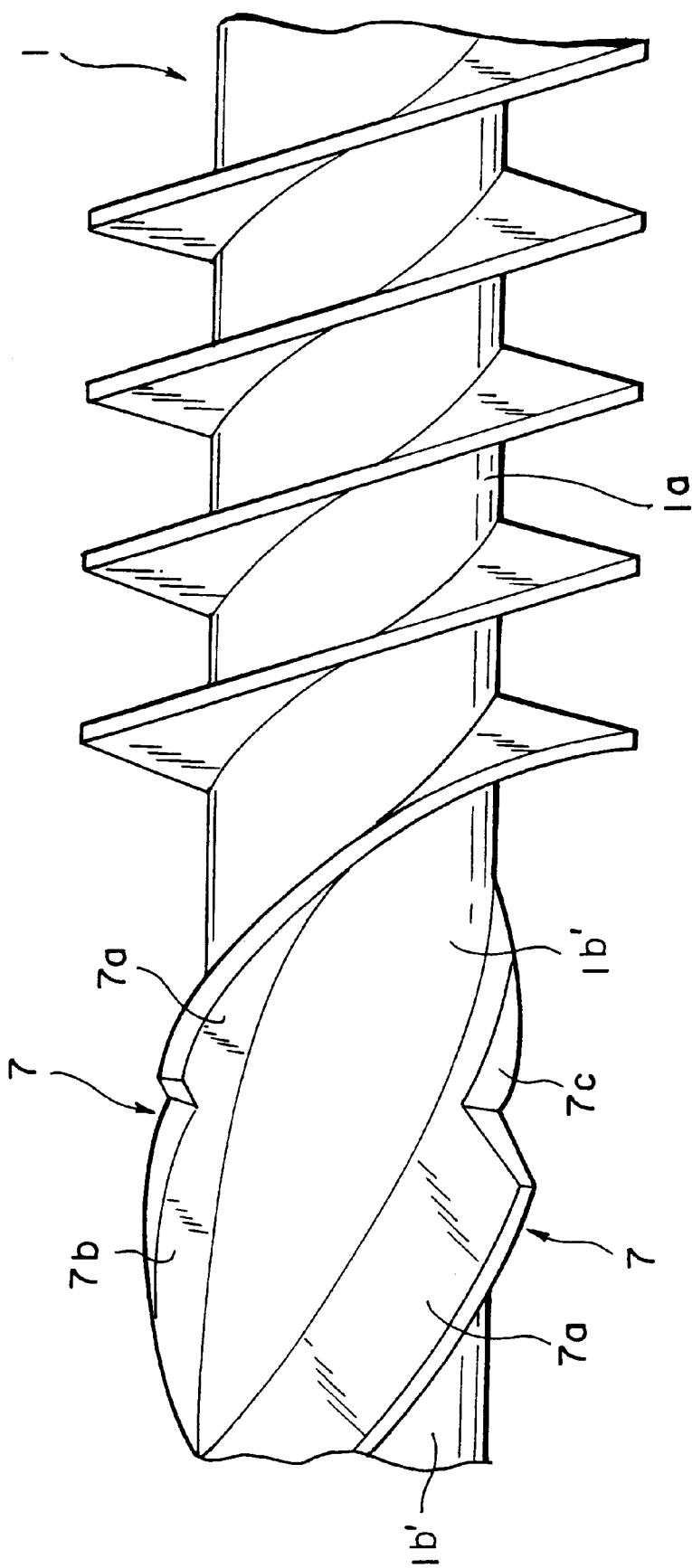
FIG. 10 is a partial front view of a screw segment.

In the present embodiment, integrated type rotor segments 1b are used as kneading segments, thereby making it possible to easily form kneading blades of various tip clearances through continuous cutting fabrication. The invention is not however limited to such a practice. In place of the integrated type rotor segments, combinations of divided type rotor segment 1b' maybe used as kneading segments as shown in FIG. 10. In this case, it is possible to obtain a screw set 1 capable of giving various tip clearances based on combinations of rotor segments 1b' by forming kneading blades so as to achieve tip clearances intrinsic to individual divided rotor segments 1b' by means of various spiral angles and quantities.

The kneading segment may comprise a plurality of divided type disk segment. In this case, it is possible to achieve combinations of various tip clearances in the circumferential direction as well as in the axial direction by combining the plurality of disk segment. Further, the kneading segment may comprise combinations of integrated type or divided type rotor segments and divided type disk segments. In this case, kneading performance can be finely adjusted by setting a high kneading performance by means of the rotor segments 1b, and then combining with disk segments having various tip clearance.

In this embodiment, the configuration has a screw set 1 having a rotor segment 1b serving as a kneading segment at a position. The configuration may however have rotor segments 1b at a plurality of positions. In this case, kneading performance can be largely improved as composed with case having a rotor segment 1b at a position. Further, the distance between axial centers of the screw sets 1 and 1 should preferably be set so as to ensure engagement of the kneading blades with a view to achieving a further improvement of kneading performance by promoting more of the material in kneading. Rotating directions of the screw sets 1 and 1 upon engagement may be the same or different.

The continuous kneading apparatus of this embodiment has a configuration of performing kneading with the two screw sets arranged in parallel. The invention is not however limited to this arrangement of the screw sets. Kneading may be accomplished with a single screw set 1, or with three or more screw sets.

In the present embodiment, tip clearance of three stages are achieved by the high-level to the low-level tip portions 7a to 7c of the kneading blades 7 arranged at equal intervals in the circumferential direction. Arrangement and quantity of kneading blades 7 and spiral angle thereof may be arbitrarily selected so far as two or more different stages of tip clearances are achieved in the circumferential direction.

Figure 8:
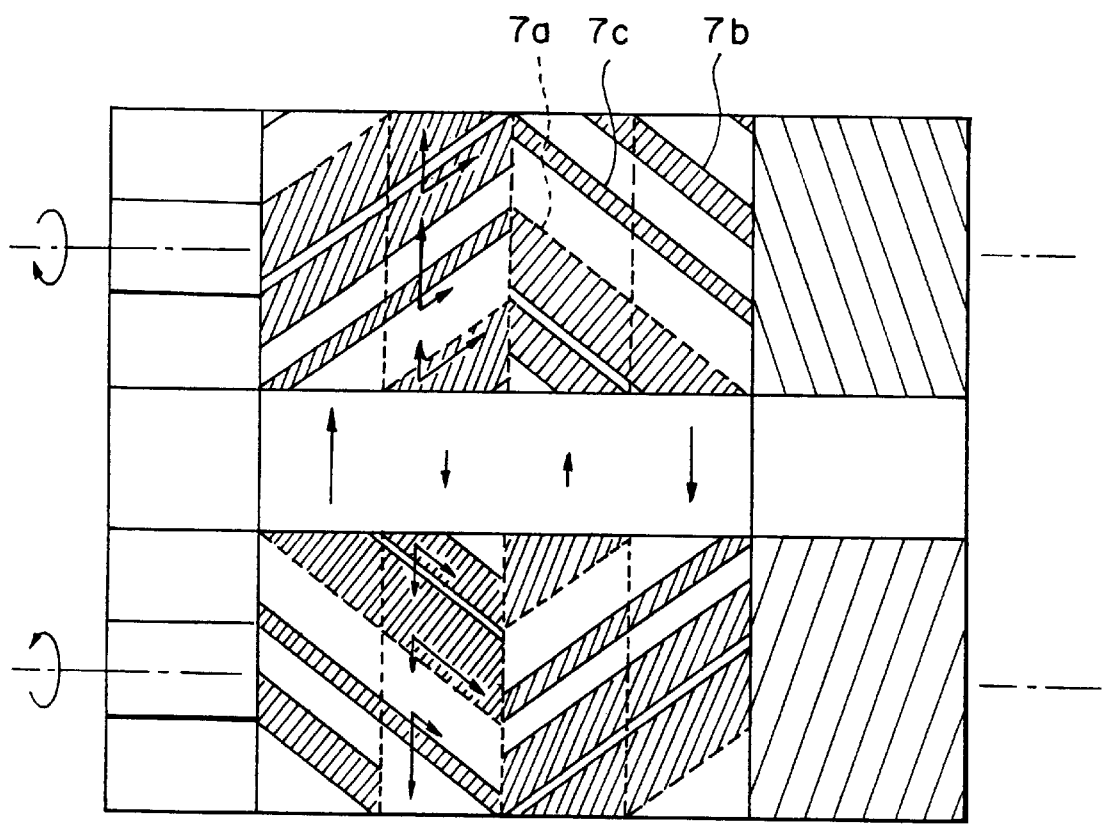
FIG. 8 is a descriptive view illustrating the flow of the material to be kneaded in the rotor segment of the invention.
Figure 9:
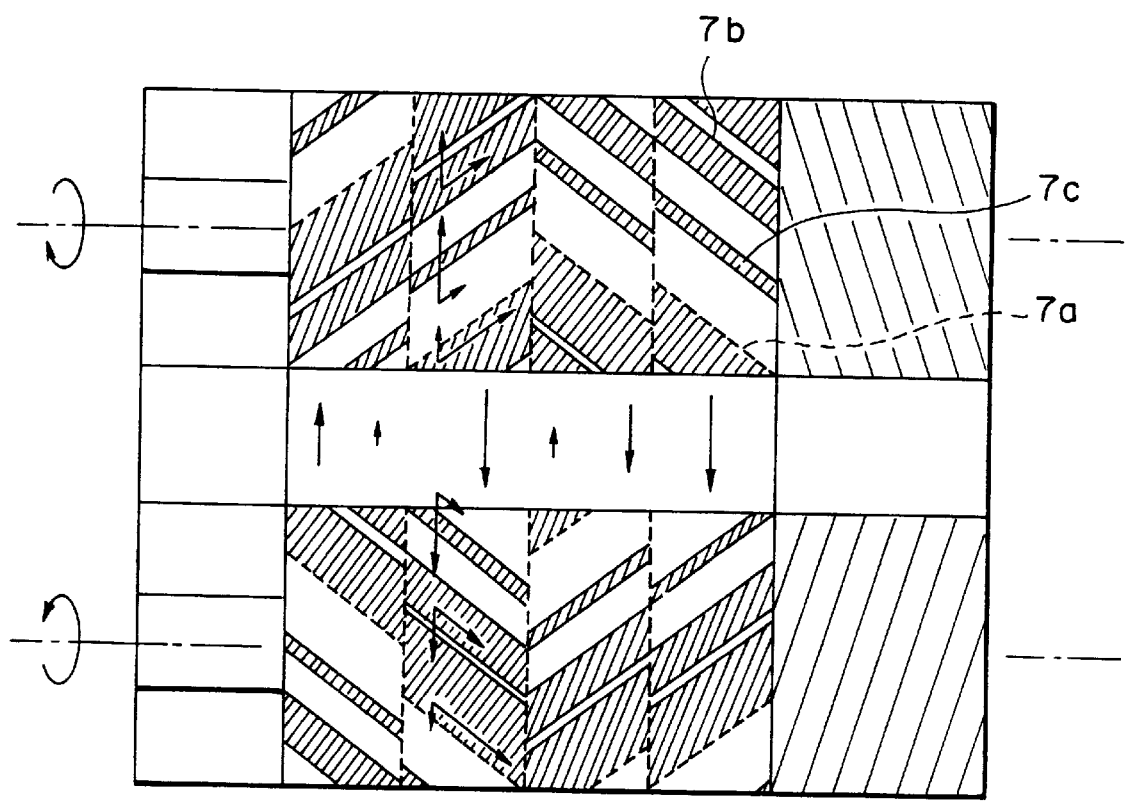
FIG. 9 is a descriptive view illustrating the flow of the material to be kneaded in the rotor segment of the invention.

More specifically, the kneading blades 7 may be arranged at equal intervals at two positions in the circumferential direction, or may be in such a configuration that, as shown in FIG. 8, the top tip in sections in the positive direction or in the reverse direction is set to any of the high-level to the low-level tip portions 7a to 7c. Further, as shown in FIG. 9, the configuration may be such that the top tips of the kneading blades 7 are classified so as to contain any two of the high-level tip portion 7a, the medium-level tip portion 7b and the low-level tip portion 7c in the sections of the positive or reverse directions, and the edges of the sections do not agree with each other.

The kneading blade 7 may be formed straight at a spiral angle of 0°, or may be formed at a large spiral angle. The spiral angle should preferably be within a range of from 10 to 60°. While a small spiral angle reduces the flow of the material in kneading in the axial direction and the resultant increase in the amount of material passing through the tip clearance permits promotion of the dispersing action, a large spiral angle allows promotion of mixing within the chamber 4 as a result of an increase in the flow in the axial direction. A spiral angle with a range of from 10 to 60° enable to derive both advantages simultaneously.

Embodiment 2

Now, an embodiment in which the present invention is applied to a kneading/extruding apparatus, a kind of twin-screw kneading apparatus, will be described below with reference to FIGS. 11 to 15.

Figure 12:
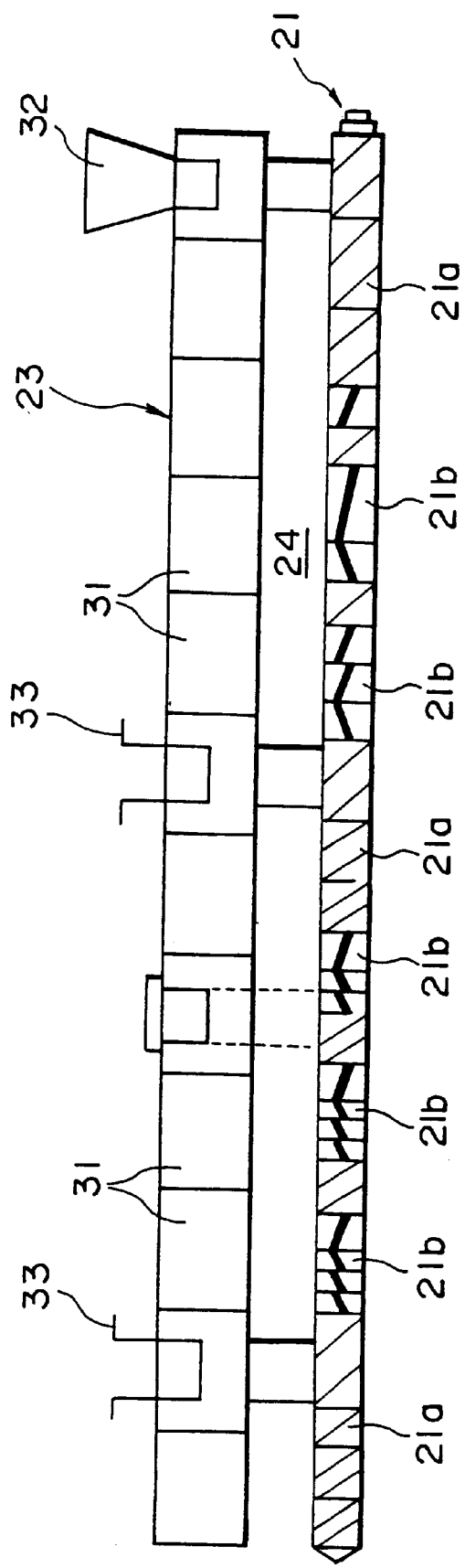
FIG. 12 is a descriptive view illustrating arrangement of the screw sets in a kneading extruding apparatus.
Figure 14A:
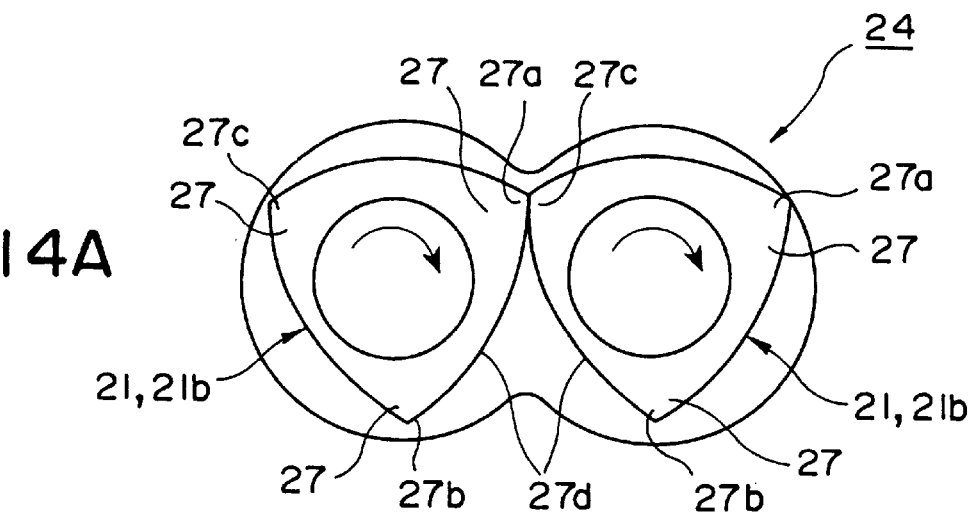
FIG. 14 is a descriptive view illustrating scraping of the material to be kneaded adhering to the rotor segment by a high-level tip portion.
Figure 14B:
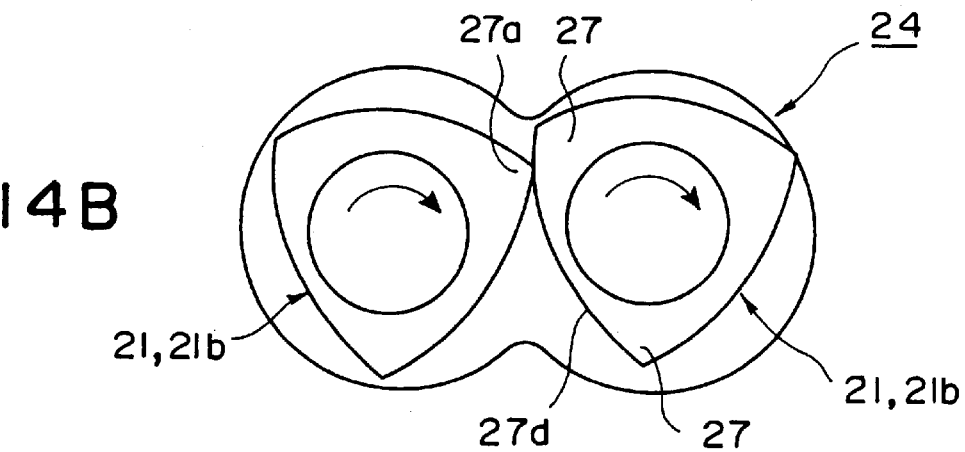
Figure 14C:
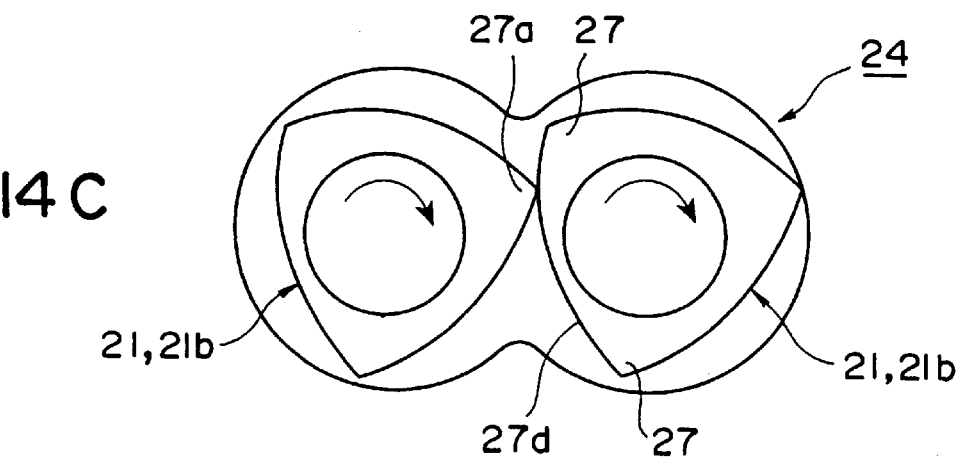
Figure 15A:
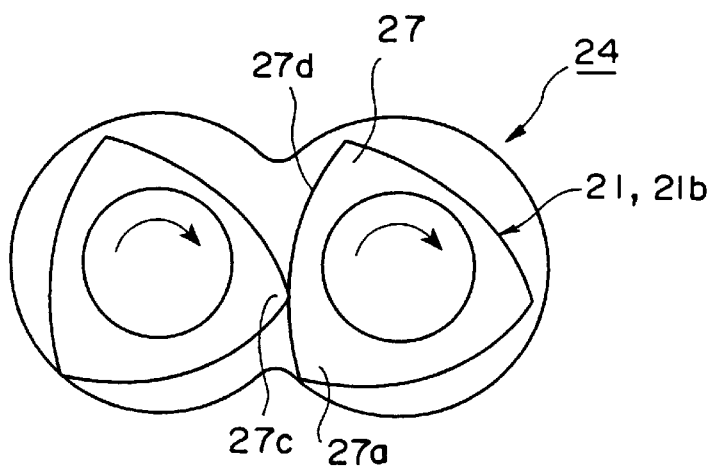
FIG. 15 is a descriptive view illustrating scraping of the material to be kneaded adhering to the rotor segment by a low-level tip portion.
Figure 15B:
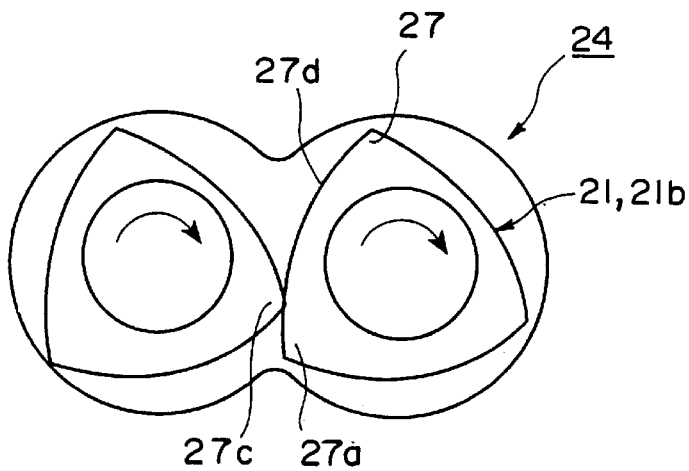
Figure 15C:
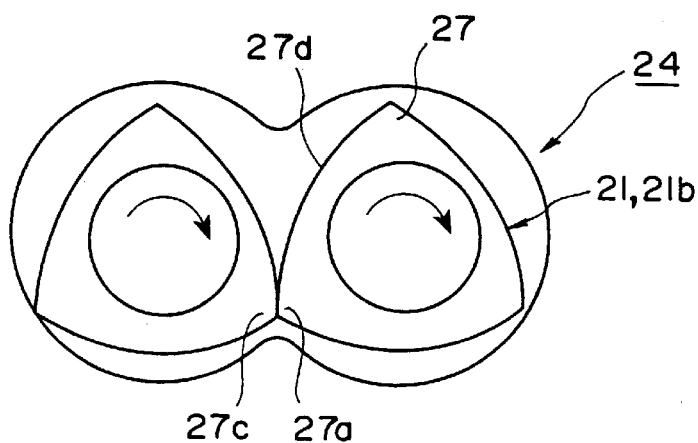

As shown in FIG. 12, the kneading/extruding apparatus of this embodiment has a case member 23 formed by connecting in series a plurality of barrels 31, and a pair of screw sets 21 rotatably supported by the case member 23. A cooling piping not shown is connected to the outer wall of the case member 23 so as to cool the kneaded product through the case member 23. A chamber 24 ensuring communication from one side (right side in FIG. 12) to the other (left side in FIG. 12) is on the other hand formed in the interior of the case member 23. A charging hopper 32 for supplying material to be kneaded such as rubber or plastics into the chamber 24 and a plurality of bent members 33 for pulling out the kneaded product during kneading are provided throughout the entire upper surface of the case member 23 from one side to the other thereof. A die head not shown for discharging the kneaded product to outside is provided on the other end of the case member 23.

Figure 11:
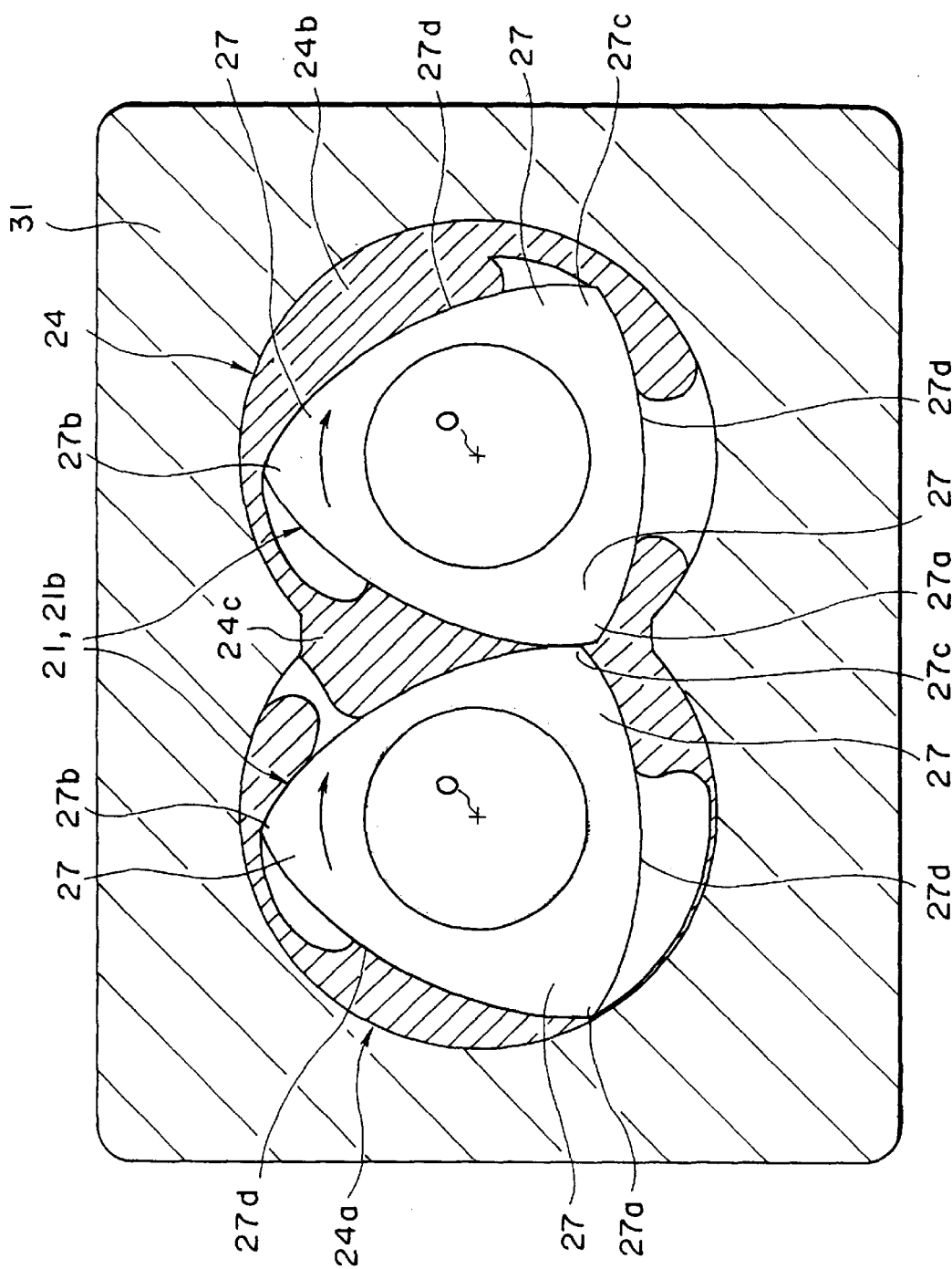
FIG. 11 is a descriptive view illustrating kneading of the material to be kneaded.

The aforesaid chamber 24 is formed into an elliptic cross-sectional shape as shown in FIG. 11, and compress a first kneading chamber 24a and a second chamber 24b in a pair, and a communicating section 24c providing communication between these kneading chambers 24a and 24b. The foregoing screw sets 21 and 21 are inserted into the first and the second kneading chambers 24a and 24b, respectively. These screw sets 21 and 21 are arranged so that the axial centers thereof are in parallel with each other, and rotation-driven in the same directions by a driving mechanism not shown.

The rotational centers (axial centers or rotational axes) of the both screw sets 21 and 21 by the driving mechanism are aligned with the chamber center of the case member 23. A chamber center is present in each of the kneading chambers 24a and 24b of the chamber 24 and forms the central point located at an equal distance from the wall surface of each of the kneading chambers 24a and 24b having an arcuate cross-section. Each of the screw sets 21 and 21 has screw segments 21a pushing the material to be kneaded to the other side and rotor segments 21b kneading the material at a plurality of positions as shown in FIG. 13. The segment centers of these segments 21a and 21b are aligned with the rotational center (chamber center) of the screw set 21. The segment center of the screw segment 21a is a central point located at equal distances from the screw blade tops when forming the screw blades of the same height in the circumferential direction. The segment center of the rotor segment 21 is a central point located at equal distances from tops of the kneading blades 27 when forming the kneading blades 27 described later of the same height in the circumferential directions.

Each of the foregoing screw sets 21 and 21 has screw segments 21a pushing the material to be kneaded to the other side and rotor segments 21b kneading the material at a plurality of positions. The rotor segment 21b has three kneading blades 27, 27 and 27 arranged at equal angular intervals of 120° in the circumferential direction. Each kneading blade 27 is spirally formed in the positive direction from one side to the middle portion, and then formed spirally in the reverse direction from the middle portion to the other side.

The foregoing kneading blade 27 is divided so that the top tip contains any two of a high-level tip portion 27a, a medium-level tip portion 27b and a low-level tip portion 27c in the sections in the positive and reverse directions, and the high-level tip portion 27a, the medium-level tip portion 27b and the low-level tip portion 27c are present on the same sectional plane for the three kneading blades 27, 27 and 27 arranged in the circumferential direction as a whole.

When the segment center of the rotor segment 21b is aligned with the chamber center, the distances between the segment center and the foregoing tip portions 27a, 27b and 27c are different, i.e., smaller in this order so as to arrange the tip clearances which are gaps from the chamber 24 inner wall surface are larger in this order. When dispersing a low-viscosity material or a fine filler or a pigment into a kneaded product in general, setting should be such that the individual tip portions 27a, 27b and 27c as a whole form small tip clearances. When preparing a kneaded product by dispersing a high-viscosity material, on the other hand, setting should be such that the individual tip portions 27a, 27b and 27c achieve large tip clearances as a whole. The detailed numerical ranges for the tip portions 27a, 27b and 27c, being the same as in the Embodiment 1, are omitted here.

The circumferential surface between the tops of the rotor segments 21b (tip portions 27a to 27c) is formed into a curved convex shape so that the circumferential surface 27d one of the rotor segments 21b is in contact with the tip portions 27a to 27c of the other rotor segment 21b. These rotor segments 21b and 21b displace while the high-level tip portion 27a and the low-level tip portion 27c of one rotor segment is in contact with the entire circumferential surface 27d of the other rotor segment 21b, as a result of rotation of the rotor segments 21b and 21b while in engagement with each other as shown in FIGS. 14A to 14C and FIGS. 15A to 15C, thereby scraping off the material of kneading adhering to the circumferential surface 27d.

Now, operations of the kneading/extruding apparatus having the foregoing configuration will be described below.

First, as shown in FIG. 12, a material to be kneaded such as rubber, plastics or a filler is continuously supplied into the chamber 24 from the charging hopper 32 while rotation-driving the screw cooling medium such as cooling water is caused to flow through the cooling piping connected to the outer wall surface of the case member 23 to cool the material to be kneaded in the chamber 24 via the case member 23. Depending upon the composition or kind of the material to be kneaded as in the case of a material containing a filler, it may be necessary to cause a heating medium such as hot water or steam to flow though the cooling piping to heat the material to be kneaded.

The material to be kneaded charged into the chamber 24 as above advances toward the rotor segments 21b and 21b along with rotation of the screw segments 21a and 21a. When the material to be kneaded reaches the rotor segments 21b and 21b, kneading is started at the kneading blades 27, 27 and 27 of the rotor segments 21b and 21b as shown in FIG. 11.

More specifically, as shown in FIG. 13, at the high-level tip portion 27a of the kneading blade 27 with a small tip clearance, the material in kneading comprising the material to be kneaded and a kneaded product passes through the tip clearance only in a small amount. Therefore, the material in kneading present on the forward side of the high-level tip portion 27a flows in a large quantity in the axial direction and most part accordingly moves onto the forward side of the medium-level tip portion 27b adjacent in the axial direction, only a part passing through the tip clearance. This part of the material in kneading is dispersed under the effect of a large shearing force caused by the small tip clearance. At this point, the material in kneading imparted with the large shearing force is suddenly heated simultaneously with dispersion. However, because most part of the material in kneading flows in the axial direction, heating of the material in kneading as a whole is inhibited. Even with a low allowable temperature of the material in kneading, therefore, it is possible to continue dispersion under the effect of the large shearing force.

The high-level tip portion of the kneading blade 27, which moves at a position near the inner wall surface of the chamber, scraps off the surface layer of the material in kneading adhering to the inner wall surface of the chamber 24. This improves cooling efficiency of the flowing material in kneading by the cooling piping, and further inhibits heating of the material in kneading, thereby preventing, occurrence of inconveniences such as deterioration action of the material in kneading. Further, when the high-level tip portion 27a of the kneading blade 27 displaces through the communicating section 24c, the flow of the material in kneading between the first and the second kneading chamber 24a and 24b is also accelerated, because a large pushing force pushes out the material in kneading from any of the first and the second kneading chambers 24a and 24b toward the other of the second and the first kneading chambers 24b and 24a.

In the low-level tip portion 27c of the kneading blade 27, the large tip clearance results in a large amount of passage of the material in kneading through the tip clearance. Therefore, most of the material in kneading present on the forward side of the low-level tip portion 27c moves to the forward side of the medium-level tip portion 27b adjacent in the circumferential direction, and only a part flows in the axial direction. Because the pushing force pushing out the material in kneading is low, the flow to the fist and the second kneading chambers 24a and 24b is inhibited upon moving though the communicating section 24c. In the low-level tip portion 27c, therefore, the flow of the material in kneading in the same kneading chambers 24a and 24b is promoted, and at the same time, during this flow, the large tip clearance reduces the shearing force acting on the material in kneading, thus inhibiting excessive heating of the material in kneading.

Then since the medium-level tip portion 27b of the kneading blade 27 is set so as to give a tip clearance coming between the high-level tip portion 27a and the low-level tip portion 27c, the shearing force and the flow for the material in kneading are adjusted.

When the material in kneading is kneaded as described above, there are arranged the following these spaces in succession in the circumferential direction as well as in the axial direction: a first kneading space 30a for passing the material in kneading in a large quantity in the circumferential direction, a second kneading space 30b dispersing a small quantity of material in kneading under the effect of a large shearing force while causing a large quantity of material in kneading in the axial direction, and a third kneading space 30c imparting shearing force of a magnitude coming in between to cause the flow in the axial direction as well as in the circumferential direction. Therefore, as compared with the conventional case where the kneading blade 27 is configured only with a medium-level tip portion 27b, a satisfactorily kneaded product is always available without the need to change the tip clearance in response to the kneading conditions of the material in kneading, because the material in kneading is uniformly dispersed while discontinuously and actively flowing in the first to third kneading space 30a to 30c. This kneaded product is pushed out through a die head not shown.

Then, when the kind of the kneaded product is switched over, charging of the material to be kneaded into the charging hopper 32 is discontinued in a state in which rotation of the screw set 21 is maintained as shown in FIG. 12. The material to be kneaded near the charging hopper 32 is transferred to the rotor segment 21b under the effect of rotation of the screw segment 21a. At the rotor segment 21b, the material to be kneaded is kneaded into a material in kneading by the tip portions 27a to 27c of the kneading blade 27, and in parallel with this, the high-level tip portion 27a of the kneading blade 27 scrapes off the surface layer of the material in kneading adhering to the inner wall of the chamber 24, and transfers the same toward the die head serving as the discharge port. As shown in FIGS. 14A to 14C and 15A to 15C, between the screw sets 21 and 21, peripheral surface 27d of the rotor segment 21b is brought into contact with the individual tip portions 27a to 27c. The material in kneading adhering to the peripheral surface 27d is thus scraped off by the tip portions 27a to 27c. As a result, when rotation of the screw set 21 is continued, the rotor segment 21b and the inner wall of the chamber 24 cleaned and most of the material in kneading is discharged to outside. Subsequently, when the material to be kneaded in the next run is charged from the charging hopper 32 and production is started, the amount of loss of the kneaded product upon startup is reduced because there remains only a limited amount of the material in kneading.

As described above, the kneading/extruding apparatus of this embodiment is operated, as shown in FIG. 11, by causing the material to be kneaded to flow in the tip clearances between the rotor segments 21b and 21b and the inner wall surface of the chamber 24 while rotating the pair of rotor segments 21b and 21b in the same direction in the chamber 24, and at the same time imparting a shearing force for dispersion, thereby producing a kneaded product in a desired kneaded state. Each of the rotor segment 21b and 21b is provided with a plurality of kneading blades 27 having different distances between the segment center and the tops so as to achieve a plurality of tip clearances different at least in the circumferential direction when the screw set 1 aligns the segment center of the rotor segment 21b (kneading segment) with the chamber center, and is engaged so as to scrape off the material in kneading adhering to the rotor segments 21b and 21b by means of the high-level to low-level tip portions 27a to 27c of the kneading blade 27.

While, in this embodiment, the case provided with two rotor segments 21b and 21b has been described, three or more rotor segments may be used. The kneading blades formed at three positions in the circumferential direction have been described, but may be formed at two or more positions in the circumferential direction. The present embodiment has been described by means of a kneading/extruding apparatus, whereas a continuous kneading apparatus may be employed. Further, the rotor segment 21b is provided with kneading blades 27 each having high-level to low-level tip portions 27a to 27c, thereby achieving three-stage tip clearances at least in the circumferential direction. Two-stage tip clearances may be achieved at least in the circumferential direction by providing kneading blades 27 each having any two of the high-level to low-level tip portions 27a to 27c.

According to the foregoing configuration, in which the kneading blade 27 has the high-level tip portion 27a and the low-level tip portion 27c, tip clearances can be classified at least into relatively small tip clearances and relatively large ones. The small tip clearance causes most of the material in kneading present on the forward side of the tip clearance to flow in the axial direction and allows a part thereof to pass through to achieve dispersion by a large shearing force. The large tip clearance promotes the flow in the circumferential direction by passing most of the material in kneading present on the forward side and prevents heating by a small shearing force. When tip clearances different in size are formed as a result at least in the circumferential direction, the material in kneading discontinuously and actively flows in the entire chamber 24 and is dispersed by a large shearing force, and heating upon dispersion is prevented. Therefore, without the need to carry out replacing operation of the screw set as in the conventional art, it is possible to convert the material in kneading always into a kneaded product of a desired state of kneading even when the material requires severe kneading conditions such as strongly aggregating filler including carbon black or a polymer gel. When a configuration is achieved so as to form tip clearances different in size also in the axial direction, it is possible to achieve uniform kneading and dispersion.

By rotating the rotor segments 21b and 21b in the same direction while engaging with each other, at least the material in kneading adhering to the kneading blade 27 is scraped off, whereby the kneading blade 27 is sufficiently cleaned. Upon start of the next run of production of the material to be kneaded, therefore, this reduces the amount of loss of the kneaded product upon startup because there is only a slight amount of material in kneading remaining from the preceding run.

The present invention provides a twin-screw kneading apparatus for kneading a material into a kneaded product of a desired kneading state by providing a pair of screw sets to the right and the left in a chamber, causing a material to be kneaded to flow in a tip clearance between kneading segments of these screw sets and the chamber inner wall surface while rotating the screw sets at the center of the chamber, and imparting a shearing force for dispersion, wherein the kneading segments have a plurality of kneading blades having different distances between the center of the segment and the top so as to achieve a plurality of tip clearances different at least in the circumferential direction when the centers of the kneading segments are aligned with the center of the chamber.

The different tip clearances achieved by the kneading blades can be classified at least into relatively small tip clearances and relatively large tip clearances. In the small tip clearances, a major portion of the material to be kneaded present in the forward side of these tip clearances is caused to flow in the axial direction, and a part is caused to pass through to achieve dispersion under the effect of a large shearing force. In the large tip clearances, on the other hand, a major portion of the material to be kneaded present on the forward side is passed through to promote the flow in the circumferential direction for applying a uniform shearing action to the material, and heating is prevented by a small shearing force. As a result, when tip clearances different in size appear at least in the circumferential direction, the material to be kneaded is dispersed by a large shearing force while discontinuously and actively flowing in the entire chamber, and heating during dispersion is prevented. It is therefore possible always to knead the material into a kneaded product in a desired kneading state under various kneading conditions.

The distance between the center of the kneading segment and the top of the kneading blade can be changed by cutting the top of the kneading blade. It is thus possible to obtain screw sets having kneading segments capable of achieving a desired tip clearance by cutting the existing kneading segments, hence to reduce the equipment cost as compared with preparation of all new kneading segments.

Because each kneading blade corresponds to each tip clearance, change and setting of each tip clearance can be independently accomplished through adjustment of the individual kneading blades. Design is therefore easier and change and setting of tip clearances are easier than in change and setting of the individual tip clearances through determination of eccentricity positions from the relationship with all kneading blades as is disclosed in Japanese Examined Patent Publication No. 1-14,847.

Particularly when a material is kneaded through tip clearances comprising various combinations to determine tip clearances permitting achievement of optimum kneading conditions such as flow and shearing of the resin, achievement of tip clearances of various combinations by the method based on eccentricity requires preparation of kneading segments in a number equal to that of the combinations. According to the invention, it is possible to achieve optimum combinations of tip clearances with a number of kneading segments smaller than that of combinations by sequentially cutting the tops of the kneading blades. While the amount of clearance varies in response to the rotational position in the foregoing known art because tip clearances are formed on the basis of eccentricity, the amount of clearance is always constant (irrespective of the rotational position) if a single tip clearance is viewed, in the present invention, thus ensuring acting of a uniform shearing force.

Further, the kneading blades should preferably be configured so as to achieve three different kinds of tip clearance in the circumferential direction. More specifically, medium tips forming medium tip clearances should preferably be provided so as to adjust shearing force and flow of the material to be kneaded at high-level tip portions, in addition to the high-level tip portions of the smallest tip clearances and the low-level tip portions of the largest tip clearances.

It is desirable to set the smallest tip clearances within a range of from 0.002 to 0.02 relative to the inside diameter, and the largest tip clearances within a range of from 0.08 to 0.2 relative to the inside diameter. When providing three kinds of tip clearances including high-level, low-level and medium-level tip portions, the smallest tip clearances should preferably be within a range of from 0.002 to 0.02, the largest tip clearances, within a range of from 0.08 to 0.2, and the medium tip clearances, within a range of from 0.02 to 0.08.

When the foregoing kneading segments are integrated type rotor segments, it is possible to easily form kneading blades for various tip clearances through continuous cutting.

When the foregoing kneading segments are divided type rotor segments, it is possible to achieve various tip clearances in the form of combinations of various rotor segments by forming kneading blades so as to achieve tip clearances intrinsic to individual divided rotor segments with various spiral angles and various quantities.

When the foregoing kneading segments are a plurality of divided type disk segments, it is possible to achieve various combinations of tip clearances in the circumferential directions as well as in the axial direction by combining the plurality of disk segments.

When the foregoing kneading segments comprise combinations of integrated type or divided type rotor segments and divided type disk segments, the kneading performance can be fine-adjusted by first roughly setting kneading performance by means of the rotor segments, and then combining disk segments having various tip clearances.

It is possible to largely improve kneading performance by providing the foregoing kneading segments at a plurality of positions.

Further, by causing the kneading blades of the kneading segments in the both screw sets to engage with each other, transfer of the material to be kneaded between the screw sets is promoted, thus further improving kneading performance.

In addition, the both screw sets are rotated in a direction so as to scrape off the material to be kneaded adhering to the kneading segments by means of the kneading blades in engagement. Because this scrapes off the material to be kneaded adhering to the kneading segments with the kneading blades, the kneading segments are in a well cleaned state. When production of the kneaded product for the next run is started, there is only a slight amount of residual material to be kneaded from the preceding run, thus permitting reduction of loss of the material to be kneaded upon starting up production.

The peripheral surface between the tops of the kneading blades in the foregoing kneading segments is formed into a curved convex shape so as to be in contact with the top of the kneading blade in engagement. This permits more excellent scraping of the material to be kneaded adhering to the kneading segments by means of the kneading blades.

As a result, there is available an effect of sufficiently scraping off the material in kneading adhering to the kneading segment by the action of the kneading blade.

What is claimed is:

1. A twin-screw kneading apparatus comprising;

a chamber;

a first screw set and a second screw set rotatable mounted in said chamber:

at least one kneading segment formed on each of the first and second screw sets; and first and second kneading blades formed on each of said at least one kneading segment, said first kneading blade having a tip clearance, relative to an inside diameter of said chamber, which is greater than a tip clearance of a said second kneading blade, thereby forming two different tip clearances in at least a circumferential direction, when a rotational axis of said at least one kneading segment is aligned with a chamber center of said chamber.

2. A twin-screw kneading apparatus according to claim 1, further comprising a third kneading blade with a third tip clearance, which is different from said first and second tip clearances in the circumferential direction.

3. A twin-screw kneading apparatus according to claim 2, wherein the tip clearance of said first kneading blade is within a range of from 0.002 to 0.02 relative to the inside diameter of the kneading chamber and the tip clearance of said second kneading blade is within a range of from 0.08 to 0.2 relative to the inside diameter of the kneading chamber, and the tip clearance of said third kneading blade is within a range of from 0.02 to 0.08 relative to the inside diameter of the kneading chamber.

4. A twin-screw kneading apparatus according to claim 1, wherein the tip clearance of said first kneading blade is within a range of from 0.002 to 0.02 relative to the inside diameter of the kneading chamber and the tip clearance of said second kneading blade is within a range of from 0.08 to 0.2 relative to the inside diameter of the kneading chamber.

5. A twin-screw kneading apparatus according to claim 1, wherein said at least one kneading segment comprises an integrated type rotor segment.

6. A twin-screw kneading apparatus according to claim 1, wherein said at least one kneading segment comprises a divided type rotor segment.

7. A twin-screw kneading apparatus according to claim 1, wherein said at least one kneading segment comprises a plurality of divided type disk segments.

8. A twin-screw kneading apparatus according to claim 1, wherein said kneading segment comprises a combination of an integrated type and a divided type disk segment.

9. A twin-screw kneading apparatus according to claim 1, wherein a plurality of kneading segments are provided at a plurality of positions.

10. A twin-screw kneading apparatus according to claim 9, wherein corresponding kneading blades in said first and second screw sets engage with each other.

11. A twin-screw kneading apparatus according to claim 10, wherein said first and second screw sets are configured to rotate in a direction so that corresponding kneading blades provided on said first and second screw sets engage and scrape off an object to be kneaded adhering to said kneading segments.

12. A twin-screw kneading apparatus according to claim 11, wherein a peripheral surface between tips of the kneading blades in said at least one kneading segments of said first screw set is a curved convex shape so as to be in contact with a tip of a kneading blade of said second screw set.

13. A twin-screw kneading apparatus according to claim 1, wherein said kneading segment comprises a combination of a divided type rotor segment and a divided type disc segment.

* * * * *